(12) United States Patent
Gough

(10) Patent No.: US 8,689,969 B2
(45) Date of Patent: Apr. 8, 2014

(54) CONVEYORS AND TRANSMISSION BELTS

(76) Inventor: George Terah Gough, Stoke on Trent (GB)

( * ) Notice: Subject to any disclaimer, the term of this patent is extended or adjusted under 35 U.S.C. 154(b) by 517 days.

(21) Appl. No.: 12/676,657

(22) PCT Filed: Sep. 5, 2008

(86) PCT No.: PCT/GB2008/002998
§ 371 (c)(1),
(2), (4) Date: Sep. 29, 2010

(87) PCT Pub. No.: WO2009/030913
PCT Pub. Date: Mar. 12, 2009

(65) Prior Publication Data
US 2011/0048901 A1    Mar. 3, 2011

(30) Foreign Application Priority Data

Sep. 5, 2007   (GB) .................... 0717231.5

(51) Int. Cl.
*B65G 17/38*    (2006.01)
*B65G 15/48*    (2006.01)
*B65G 19/20*    (2006.01)

(52) U.S. Cl.
USPC ........ 198/835; 198/800; 198/844.1; 198/837; 198/845

(58) Field of Classification Search
None
See application file for complete search history.

(56) References Cited

U.S. PATENT DOCUMENTS

| | | |
|---|---|---|
| 1,508,481 A | 9/1924 | Sonesson |
| 2,646,161 A | 7/1953 | Lorig |
| 3,728,066 A | 4/1973 | Stadler et al. |
| 3,772,930 A | 11/1973 | Lamport et al. |
| 3,851,536 A | 12/1974 | Zeldman |
| 4,267,921 A * | 5/1981 | Kell ............................ 198/847 |
| 4,946,028 A | 8/1990 | Eichmann et al. |
| 5,037,359 A | 8/1991 | Koster et al. |
| 5,660,266 A | 8/1997 | Nolte |
| 6,164,432 A * | 12/2000 | Monsees .................... 198/459.4 |
| 2006/0219526 A1 | 10/2006 | Costanzo et al. |

FOREIGN PATENT DOCUMENTS

| | | |
|---|---|---|
| DE | 363894 C | 11/1922 |
| DE | 2655487 A * | 6/1978 |
| DE | 94 03 404.4 U1 | 4/1994 |
| DE | 10 2004 008 165 A1 | 8/2005 |
| EP | 0 352 047 A | 1/1990 |
| JP | 46012060 | 3/1971 |
| JP | 02142712 U | 12/1990 |
| JP | 03041243 A | 2/1991 |

(Continued)

OTHER PUBLICATIONS

United Kingdom Search Report dated Oct. 29, 2007 for Patent Application GB0717231.5.

(Continued)

*Primary Examiner* — Kavel Singh
(74) *Attorney, Agent, or Firm* — Shumaker, Loop & Kendrick, LLP

(57) ABSTRACT

A belt (2), forming a conveyor or a transmission belt, comprising at least one, but possibly a plurality of substantially inextensible but elastically flexible planar strips, typically of spring steel, rigidly fixed together lengthwise to form an endless belt. The belt is typically provided with drive slots for accurately driving the belt. The belt may support carriers such as buckets (to form a bucket conveyor) or scrapers (to form a scraper conveyor).

15 Claims, 21 Drawing Sheets

(56) References Cited

FOREIGN PATENT DOCUMENTS

| | | | |
|---|---|---|---|
| JP | 06286843 A | 11/1994 | |
| JP | 07508963 A | 10/1995 | |
| WO | 9402391 A | 2/1994 | |
| WO | WO 01/55659 A | 8/2001 | |
| WO | WO 02/100745 A | 12/2002 | |
| WO | WO2007082994 A1 | 7/2007 | |

OTHER PUBLICATIONS

International Search Report of the European Patent Office dated Mar. 17, 2009 for International Application No. PCT/GB2008/002998.

Notification of Reason (S) for Refusal; Dated Apr. 30, 2013; Patent Application No. 2010-523584; Applicant Masaki Gotoh.

* cited by examiner

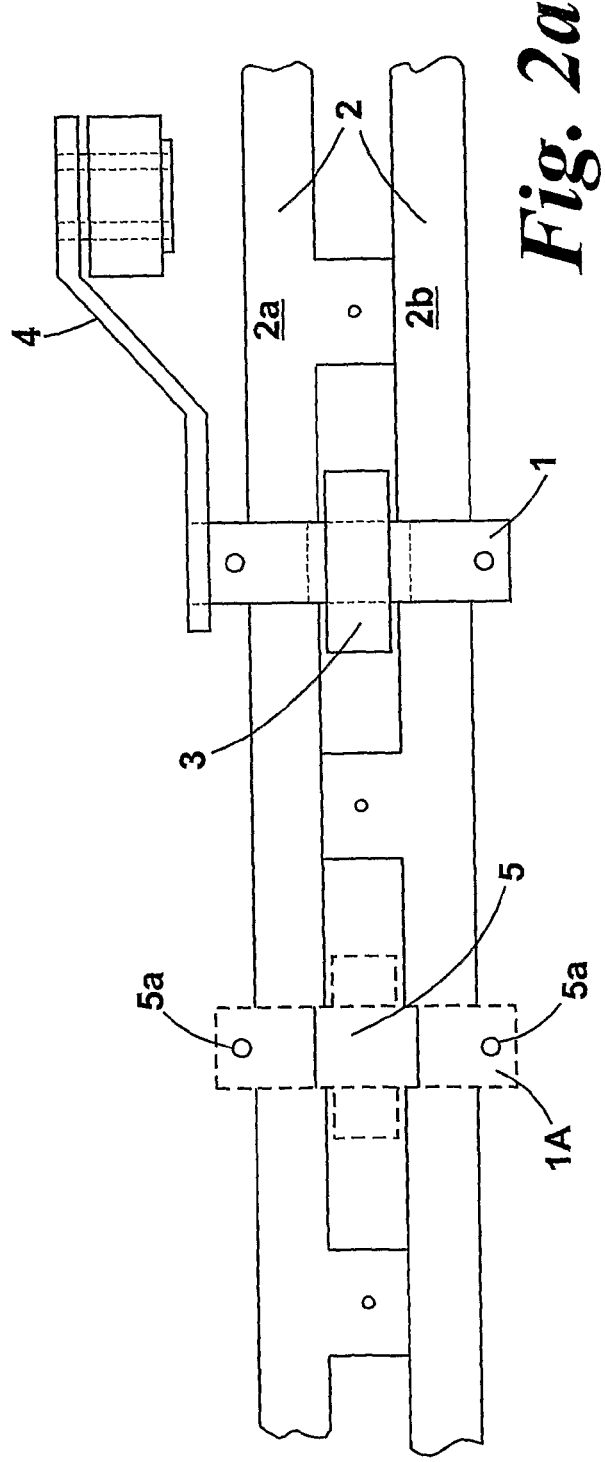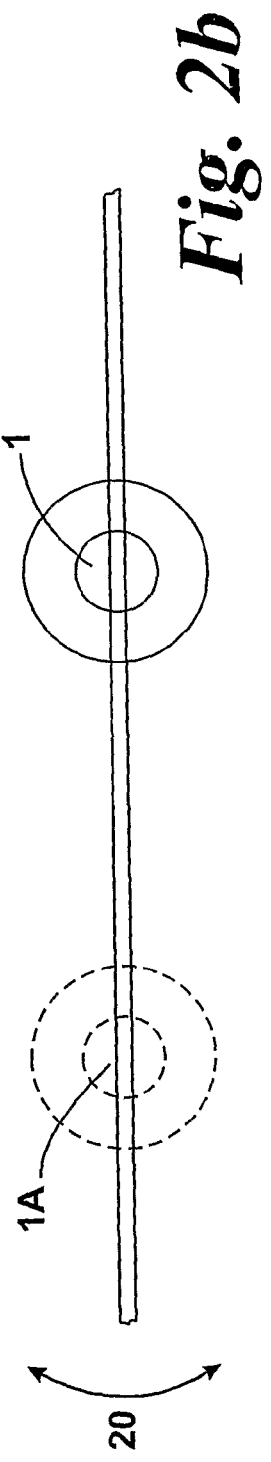

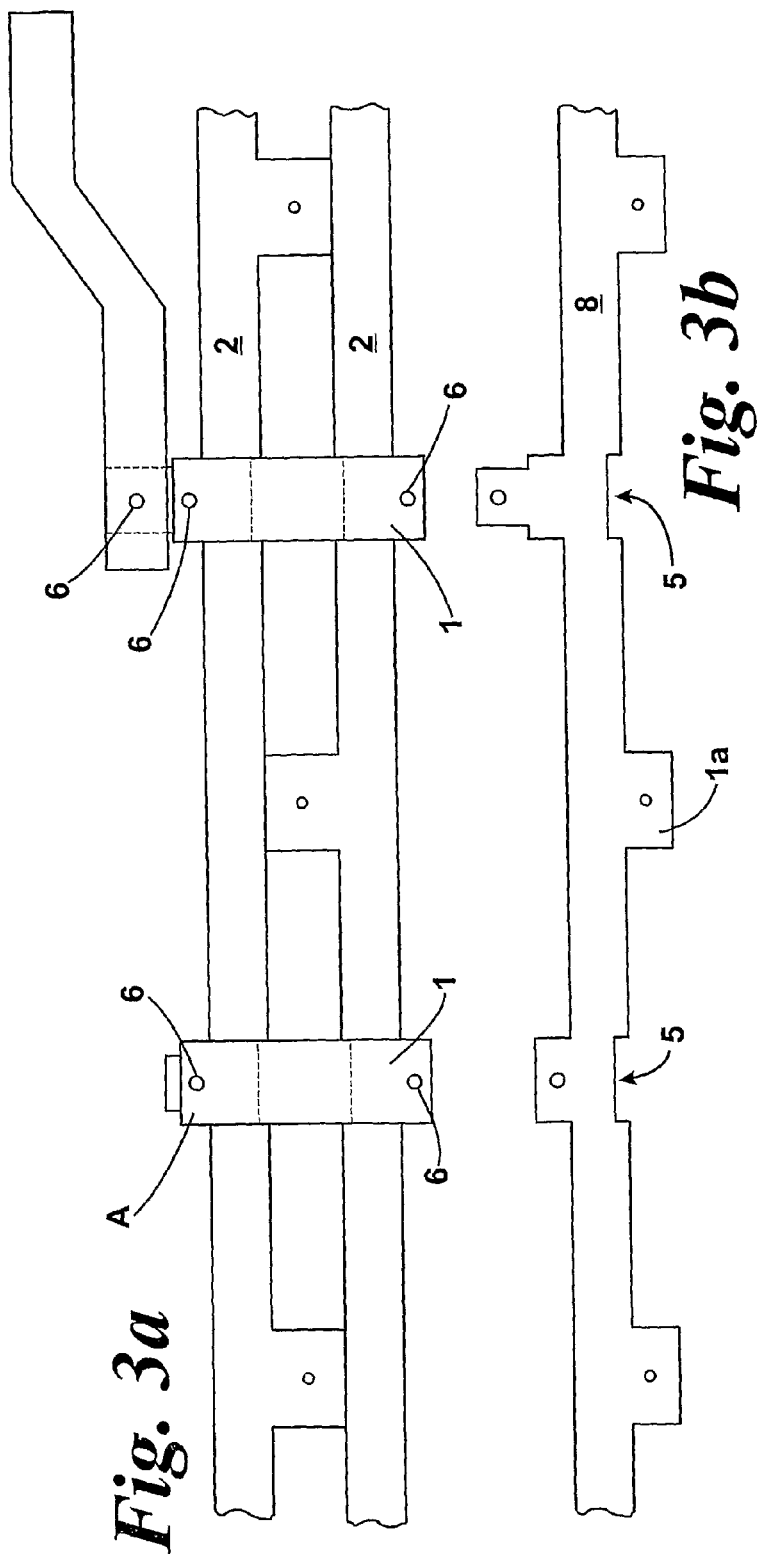

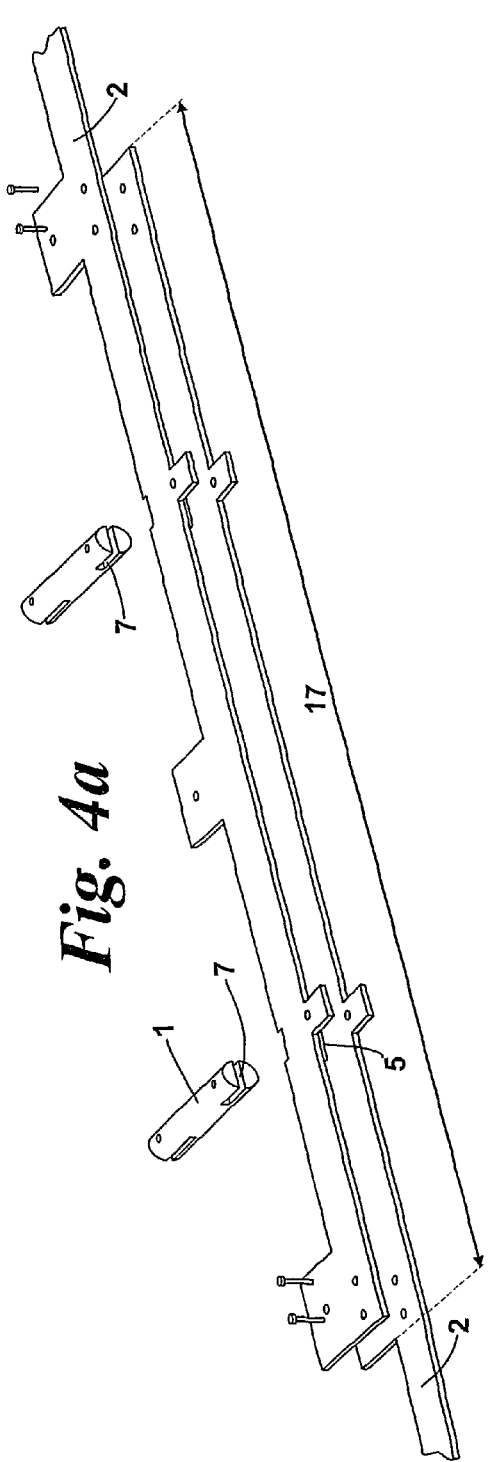
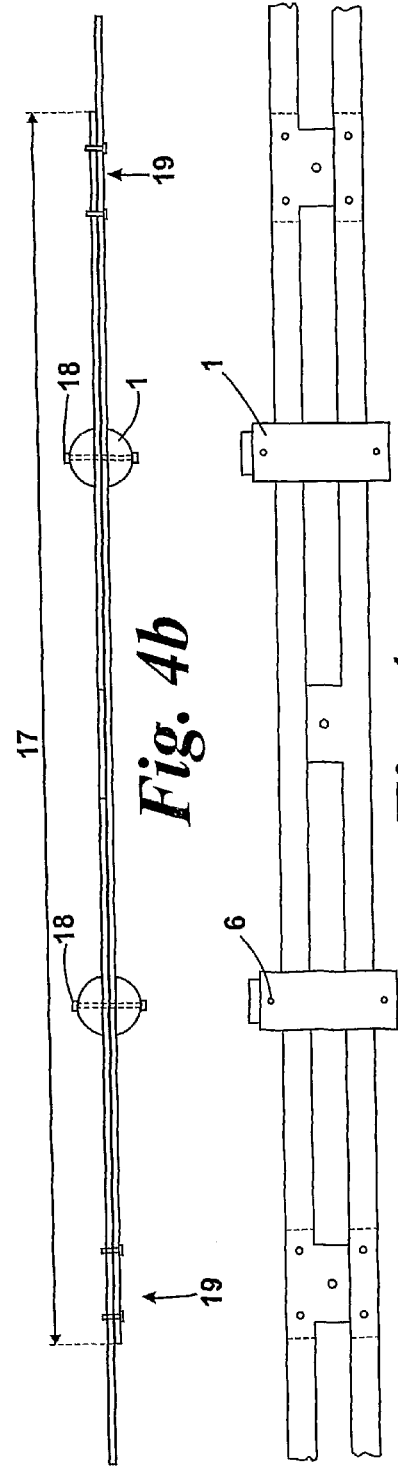
Fig. 4a
Fig. 4b
Fig. 4c

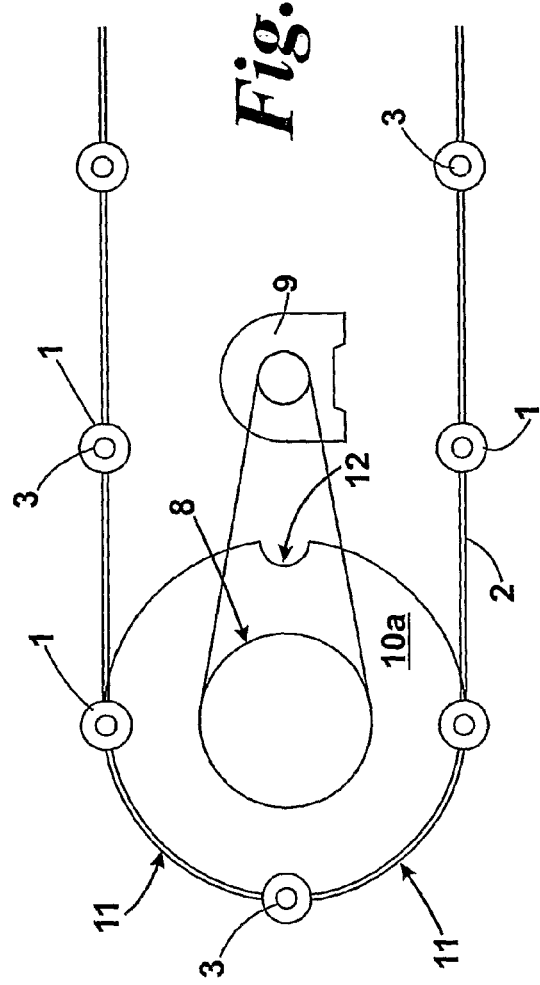
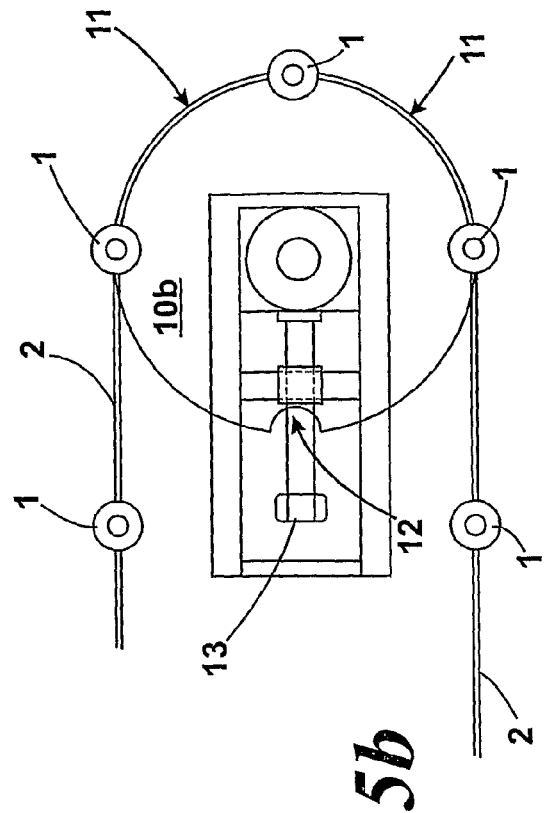
*Fig. 5a*
*Fig. 5b*

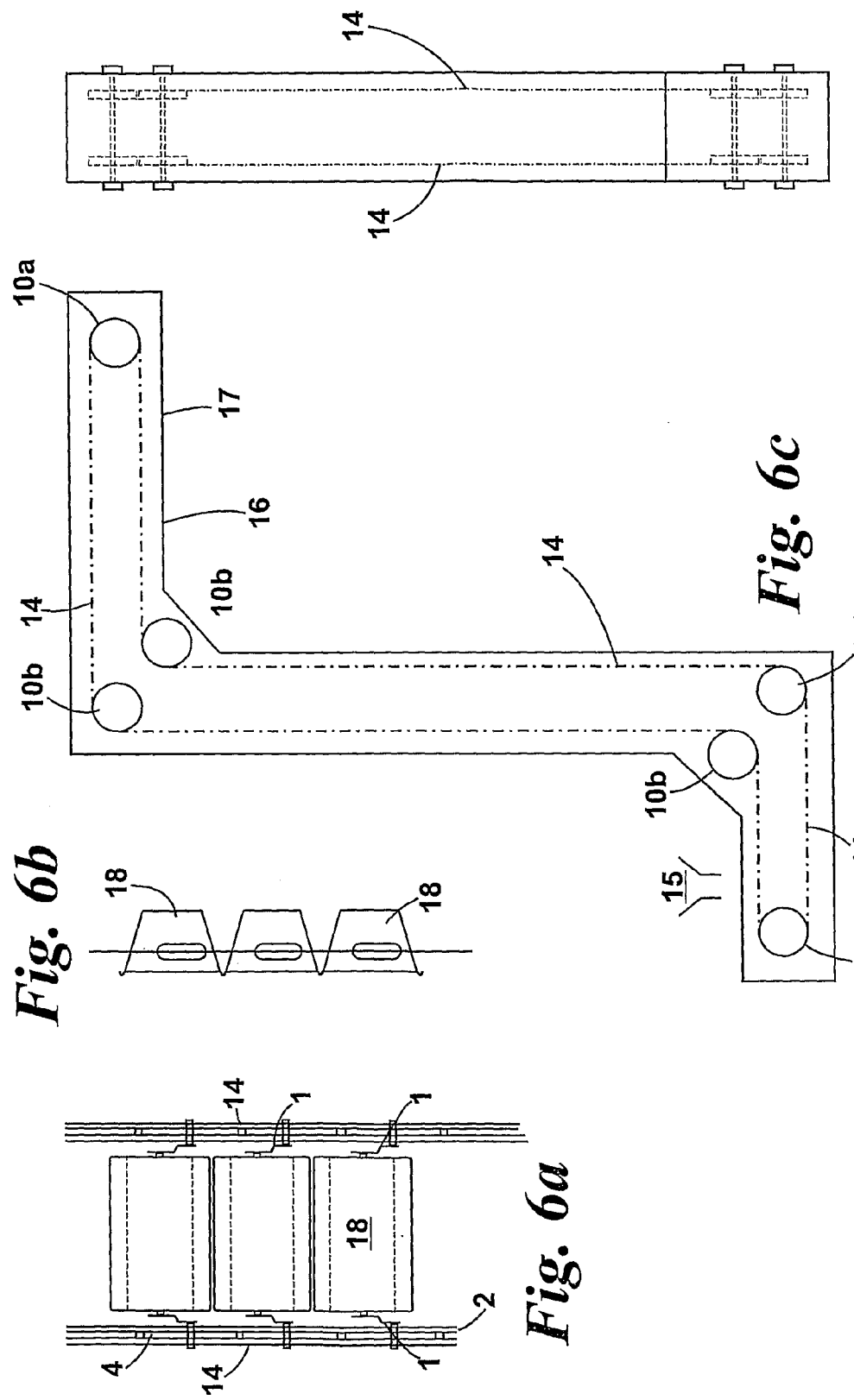

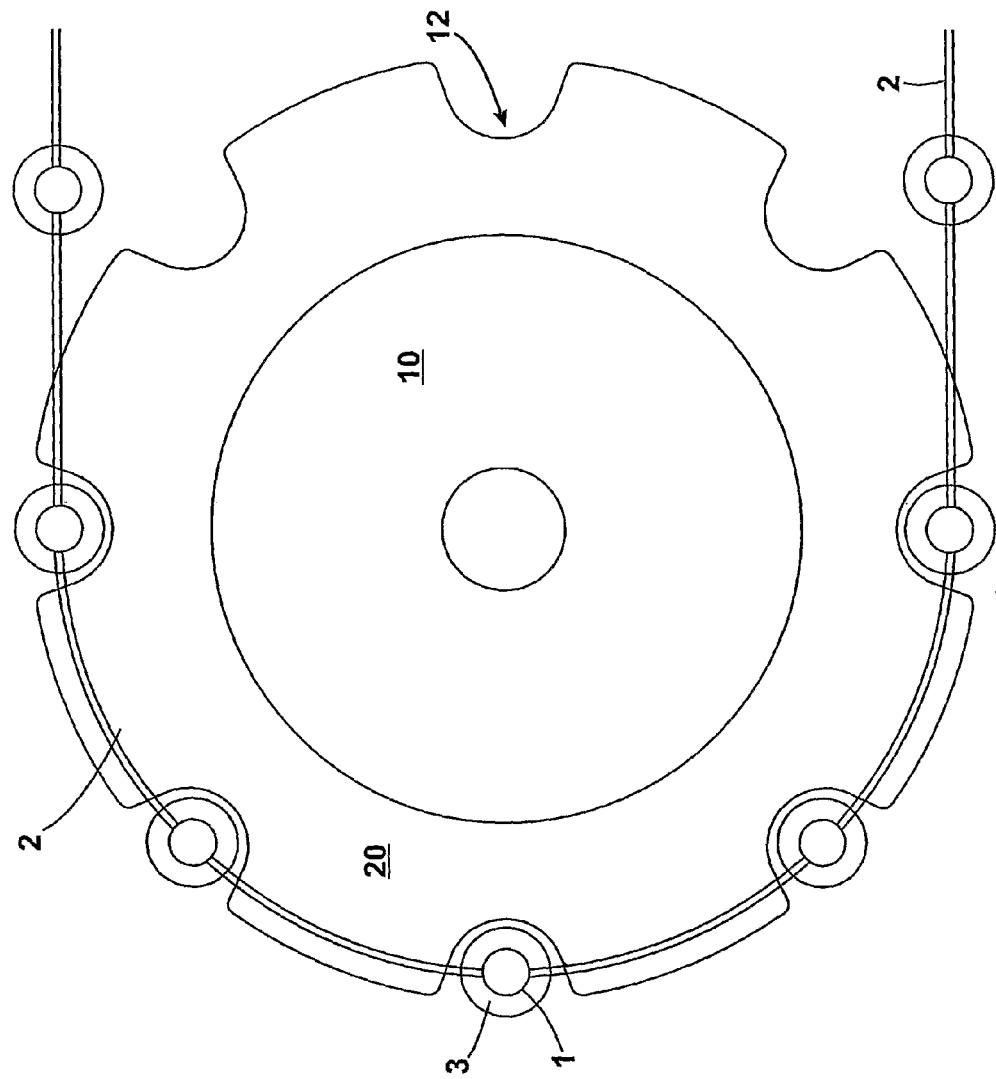
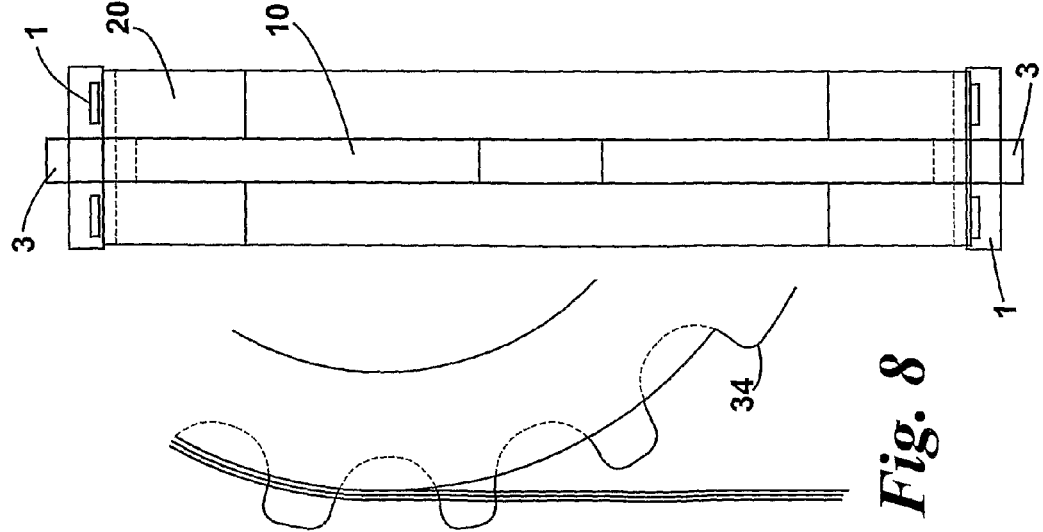

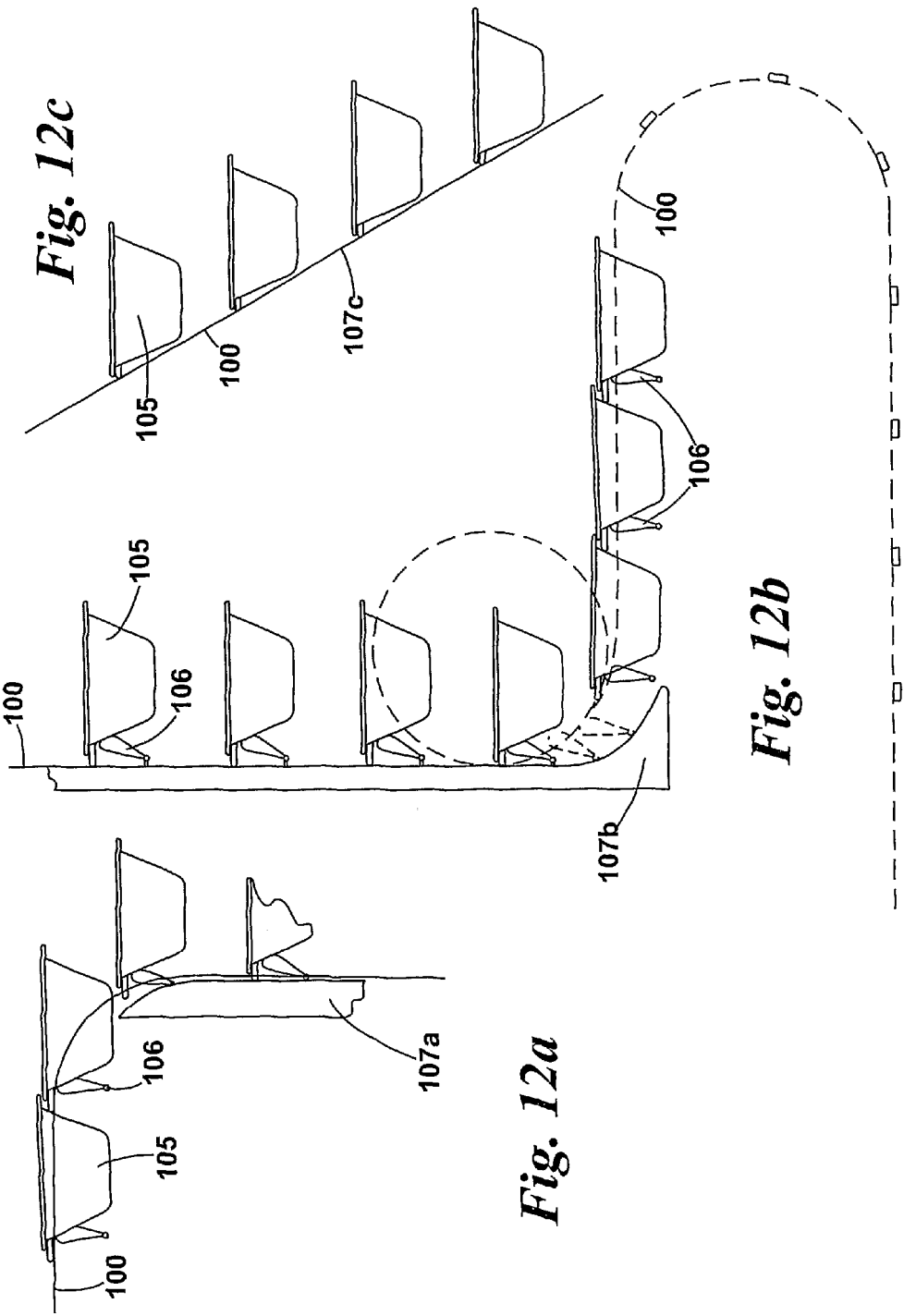

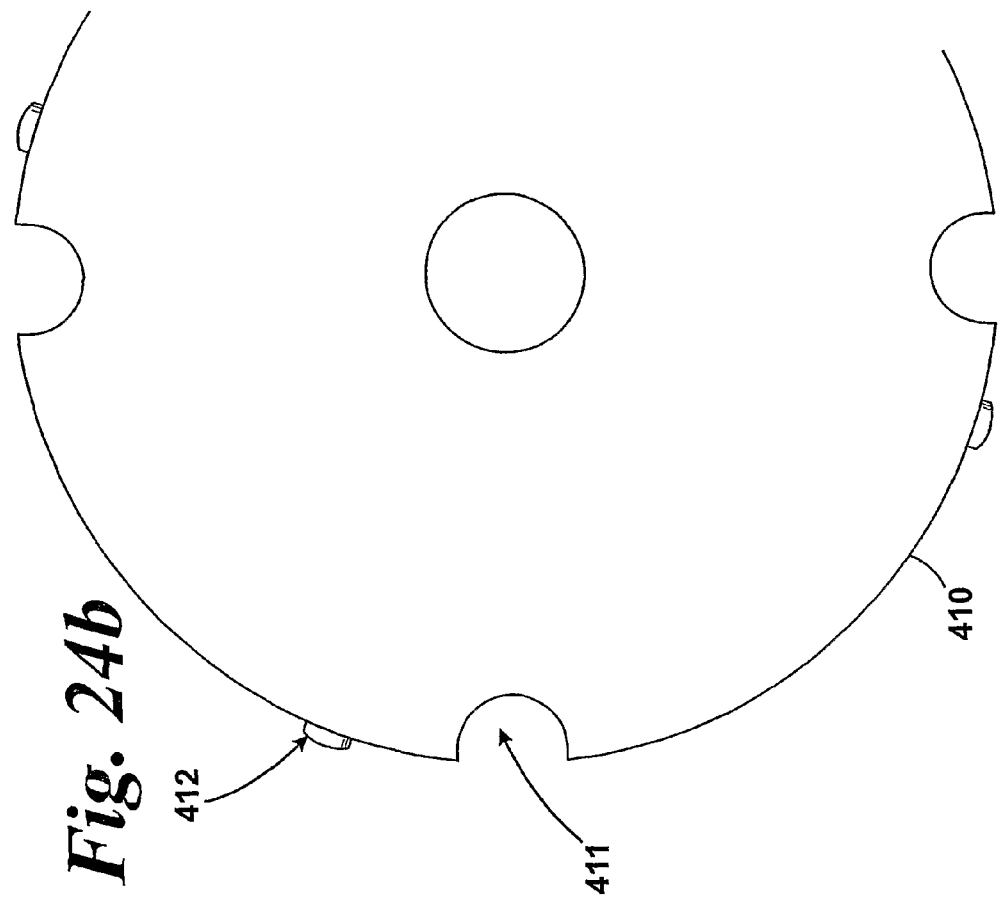
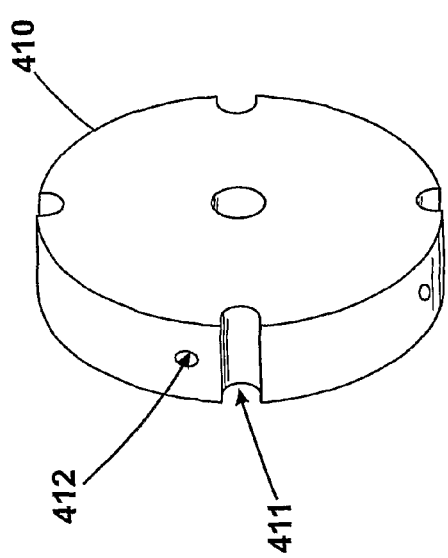
Fig. 24b
Fig. 24a

CONVEYORS AND TRANSMISSION BELTS

TECHNICAL FIELD AND BACKGROUND OF THE INVENTION

This invention relates to belts and conveyors such as, but not necessarily limited to, such conveyors that can be used to transport items from one place to another or that can be used as transmission belts.

Conveyors of the form of endless belts or chains are well known in the prior art. An endless belt comprising a chain or rope and driven at some point along the belt can either carry goods directly on its surface or hanging from buckets or so on connected to the belt. Such a system is described in EP 0 352 047.

Chains and other belts comprising links that are jointed together are well known as requiring frequent lubrication to stop them seizing. Such lubrication is inconvenient.

Another known system is the so-called floating flight scraper conveyor. This comprises usually two endless chains moving along the direction of travel, and a plurality of scraper bars mounted between the chains transverse to the direction of travel, the scraper bars being pivotally mounted relative to the chains. In such a case, the substance to be transported, typically a bulk material such as grain, are scraped by the scraper bars along a casing in which the conveyor is mounted.

SUMMARY OF THE INVENTION

According to a first aspect of the invention, there is provided a belt, forming a conveyor or a transmission belt, comprising at least one, but preferably a plurality of substantially inextensible but elastically flexible planar strips rigidly fixed together to form an endless belt.

Given all of the strips are fixed together in a rigid fashion, there is therefore no need for lubrication or so on. The flexible nature of the strips means that they can be bent around any guide wheels or the like guiding the conveyor; there is therefore no need for joints. Given that bending of the belt may not require any part rubbing on another, the noise emitted by such a conveyor may also be reduced as compared with prior art, typically chain-based systems. The conveyor may also be usable as a transmission belt. In such a case, instead of being used to conveyor items, the belt may be used to transfer motion from one element to another.

It is to be noted that where we refer to strips below, we include the singular unless the context requires otherwise.

Preferably, the strips are fastened together at regular intervals; the strips may be keyed at consistent intervals to achieve this. The strips may be a consistent length.

In the preferred embodiment, the strips comprise metal or metal materials, such as spring steel. Spring steel has been found to be a particularly convenient material with which to make the strips, given that its elastic qualities and tensile strength are as required by the invention. It is also more economical to produce and convenient to work with present advanced manufacturing technologies.

Preferably, the strips are elongate, and are elastically flexible in bending lengthwise out of their plane. Preferably, they are harder to bend widthwise out of their plane than lengthwise out of their plane. The strips may be joined together lengthwise, typically such that short ends of successive strips are joined together where there is no loss of tensile strength.

The conveyor may comprise a plurality of trunnions fixed to the endless belt at intervals along the endless belt. The use of trunnions is useful, as it allows easier interaction of the belt with other parts of the conveyor. The trunnions may comprise a generally cylindrical body fixed to the belt, with the axis of the cylindrical body at right angles to the length of the belt, but in the plane of the strips. A trunnion fixed in such a position may therefore be used to impart a force on the endless belt.

The trunnions may each comprise a roller fitted over the cylindrical body and which may be free to rotate relative to the body. This allows the belt to roll over bodies over which it would otherwise slide, thereby reducing friction. However, the trunnion need not be provided with a roller; in such a case either the trunnion or a body over which it slides may be fabricated from a low friction material, such as a low friction plastic material.

The trunnions may be provided at regular, preferably accurate, intervals along the endless belt. To this end, the strips may be keyed to locate the trunnions and/or rollers. The strips may be of a consistent length and may each be formed with the key in a consistent position. This is a convenient way of ensuring the trunnions are consistently spaced. Consistent spacing is advantageous, as it may allow the trunnions to be used to drive the endless belt.

The conveyor may be provided with two endless belts as previously described co-planar with one another in the plane of the strips. The two belts may be joined together, typically at regular intervals. The belts may also be joined together by the trunnions, such that each trunnion is fixed to both belts. Joining the two belts together separately from the trunnions makes it much easier to assemble the trunnions on the belt.

Preferably, the cylindrical body of each trunnion has two ends: a first end that engages one of the belts, preferably at a keyed portion, and a second end that engages the other belt, preferably at a keyed portion. This reduces twisting forces on the trunnions as the belt is driven. The roller may be positioned on the body between the first and second ends, typically such that the trunnion is generally symmetrical.

The conveyor may be provided with at least one drive or guide wheel engaging the endless belt, comprising at least one generally circular sprocket having indentations spaced around its circumference at the same spacing as the trunnions along the belt. The indentations may be sized and shaped so as to accept the rollers or the bodies of the trunnions. The wheel may also comprise a support for the or each belt as it passes around the wheel, which may comprise a cylindrical disk, the belt being supported on the circumferential edge of the disc in use. There may be two such discs, which may be mounted coaxially with the sprocket at either side thereof.

In an alternative or addition to trunnions, the endless belt may be provided with regularly spaced drive slots, and the conveyor may comprise a drive wheel shaped to engage the slots, typically by means of protruding teeth. This is particularly applicable where the conveyor is used as a transmission belt, as there is likely to be little need to attach other items to the belt itself.

Each trunnion may be provided in a drive slot. The drive slot may have a step in its circumference positioned so that, when the trunnion is urged in the direction along the length of the belt, the trunnion transfers the urging force to the belt through the step. As such, there may be two steps in the circumference, spaced either side of the trunnion.

Where the drive wheel comprises indentations for the trunnions, it may also comprise a plurality of guide pins, positioned so as to engage the drive slots of the belt. These guide pins ensure that the trunnions correctly engage the drive wheel. The guide pins may be formed of hardened steel.

In order that a drive wheel is provided, the conveyor may comprise drive means, such as an electric or hydraulic motor, arranged so as to be able to rotationally drive the drive wheel and so the endless belt, preferably by means of engaging the trunnions with the drive wheel. Alternatively, to provide a guide wheel, the wheel may be unpowered.

Typically where a guide wheel is provided, the wheel may also be provided with a tensioning device, whereby the tension in the endless belt can be controlled. Typically, the or each endless belt passes around the wheel, and the tensioning device is arranged to exert a force to the axis of the wheel, perpendicular to that axis. This allows the tension in the or each belt to be controlled.

At the belt may be provided with a support for a carrier, such as a bucket or scraper. The or each support may be provided at a trunnion. The support may comprise an arm extending away from the or each endless belt. There may be provided a bucket suspended from the arm.

In an alternative, the support for the carrier may comprise a bendable portion of a strip that can be resiliently bent out of the plane of the strip. Accordingly, this may provide a "spring return" for the support, such that the support is biased into a neutral position by the bendable portion. The bendable portion may be of the form of a tongue in the belt defined by a groove. The groove may be U-shaped where the tongue is provided in within a body of the belt, whereas it may be L-shaped where it is provided at the edge of the belt to provide a tongue at a longitudinal edge of the belt.

The belts may be joined together by the support for the carrier or by the carrier itself. In this case, the support may further comprise a bar mounted on the bendable portion, with a bucket or other carrier optionally mounted on the bar. The carrier may be provided with a cam; the conveyor may then further comprise a cam surface which the cam follows as the conveyor moves, controlling the orientation of the carrier relative to the or each belt.

Where the carrier comprises a scraper, the neutral position of the scraper may be in the plane of the belt. The scraper may comprise a cam portion, which cooperates with a suitable surface to force the scraper out of the neutral position at the appropriate position in the conveyor. Where the conveyor also comprises a drive or guide wheel, the wheel may also act as a suitable surface. Accordingly, the scraper may fold out of the way when not desired, but can be biased into a useful position when needed.

At the points on the endless belt where the strips are joined together, there may be provided an overlap between two strips; at the join, one of the planar strips may overlie another such that their planes are parallel and overlapping. The strips may be connected together in the overlap region. The trunnions may hold the strips together in the overlap; at least one and preferably at least two trunnions may be provided in each overlap.

DESCRIPTION OF THE FIGURES

There now follows, by way of example only, embodiments of the invention described with reference to the accompanying drawings, in which:

FIGS. 2a and 2b show a plan and side view respectively of the trunnions in the conveyor system of FIG. 1;

FIG. 3a shows two alternative trunnions for use in the conveyor system of FIG. 1;

FIG. 3b shows two examples of keys on the strips of the conveyor of FIG. 1;

FIG. 3c shows an example trunnion for use with the conveyor system of FIG. 1;

FIGS. 4a to 4c shows the connection between two of the strips of the conveyor of FIG. 1, in perspective, side and plan view respectively;

FIGS. 5a and 5b show side views of the drive and guide wheels of the conveyor system of FIG. 1, respectively;

FIGS. 6a and 6b show side and front views of a bucket conveyor system using two of the conveyors of FIG. 1;

FIGS. 6c and 6d show schematic side and front views of the bucket conveyor system of FIGS. 6a and 6b;

FIGS. 7a and 7b show a detail view of the wheels of FIGS. 5a and 5b;

FIG. 8 shows a drive wheel for use with the steel belt of FIG. 3d;

FIGS. 12a to 12c show side elevations of elements of the conveyor system of FIG. 11;

FIGS. 24a and 24b show a drive wheel for use with the conveyor of FIG. 22 in isometric and side elevation respectively.

DETAILED DESCRIPTION OF THE INVENTION

Figure 1:
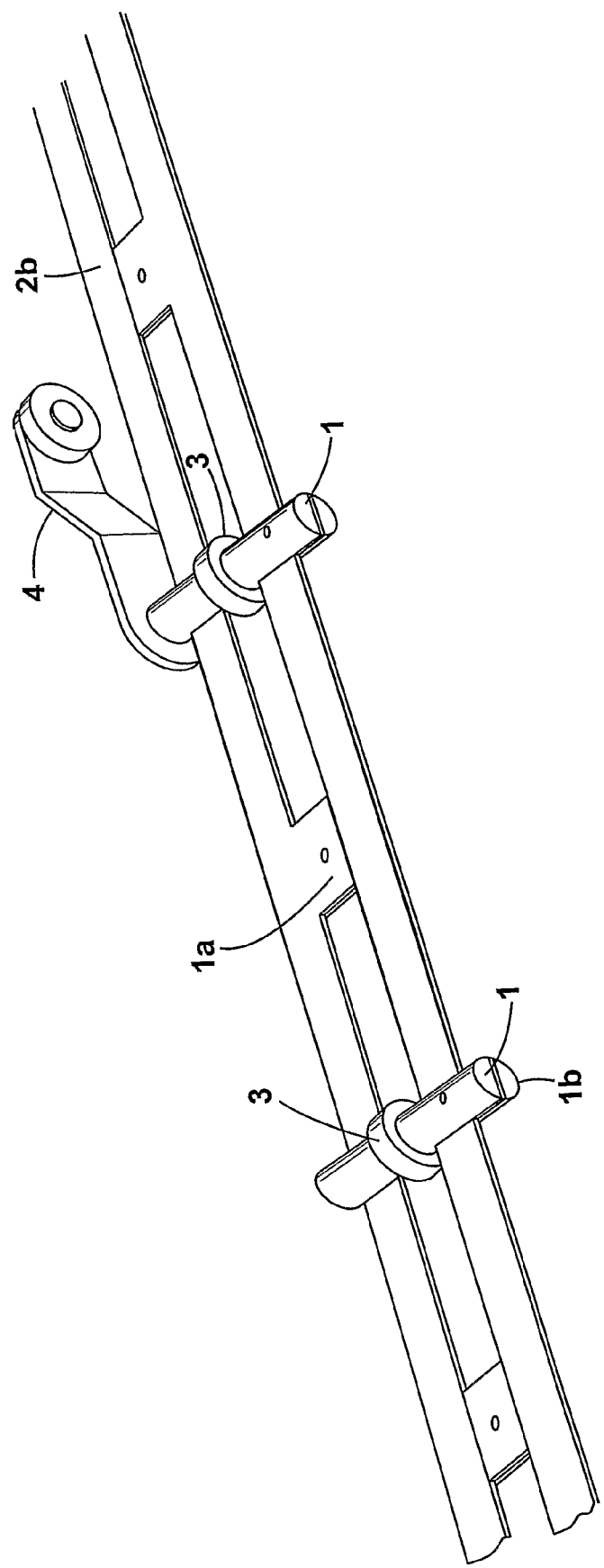
FIG. 1 shows a perspective view of part of a conveyor system according to a first embodiment of the invention.

The conveyor system according to a first embodiment of the invention is shown in FIGS. 1 to 5 and 7 and comprises two endless belts 2a, 2b. Each of these belts comprises a plurality of elongate planar strips of spring steel. The strips are joined rigidly together lengthwise to form the endless belt 2a, 2b. The two belts are joined together by a tab 1a connecting each pair of strips. The elastic nature of the strips with regards to bending the strips out of their plane lengthwise allows the belt formed by the strips to be bent back on itself (in direction of arrow 20) to form the endless belt.

Along the belts at regular intervals are provided trunnions 1. These connect the two belts together at regular, accurate intervals. The trunnions comprise a cylindrical body 1b rigidly mounted on the belts extending from one belt to the other and a roller 3 mounted rotatably on the body between the belts 2. Given that the two belts are joined together by the tabs, it is relatively easy to assemble the trunnions into the correct places.

The trunnions 1 can also be provided with mounting points for carriers such as buckets; FIG. 1 depicts a bucket arm 4 from which a bucket can be mounted.

FIGS. 2 and 3 show how the trunnions 1 are fixed to the endless belts. Each strip has regularly and consistently spaced keyed portions 5 along its length. These engage slots 7 in the body 1a of the trunnions 1. Each keyed portion also has a hole 5a. A corresponding hole 6 is found in embodiment of the trunnion 1 shown at A in FIGS. 3a to 3c. When this trunnion 1 is mounted correctly over the keyed portion 5, then holes 5a and 6 will align and a pin (not shown) can be passed through the holes 5a, 6 to securely locate the trunnion at the correct spacing along the endless belts. The pins would have substantially no tensile or longitudinal loading, as this will be taken by the location of the trunnion on the keyed portion 5.

An alternative trunnion 1 is shown at B in FIGS. 3a and 3b. It is formed of injection-moulded plastic, which is pinned through the steel strips by means of a pin 16. The same pin 16 is used to connect a bucket arm 4 to the end of the trunnion body; the arm 4 and trunnion can be injection moulded as one piece.

The connection of two successive strips to make up the endless belt is depicted in FIGS. 4a to 4c of the accompanying drawings. The strips 2 overlap along their length along overlap region 17. This encompasses two trunnion 1 mounting points and connecting tabs 1a. The trunnions 1 are mounted over keyed portions 5 and have extra thick slots 7 to accommodate the increased thickness of two strips 2. The pins 18 of the trunnions are shown in FIG. 4b, which locate the successive strips relative to one another. Additionally or alternatively, the strips could be fixed together as shown at 19.

The drive 10a and guide 10b wheels used to guide and drive the endless belts 2 are shown in FIGS. 5 and 7 of the accompanying drawings. The wheels 10a, 10b are of the form of sprocket wheels having indentations 12 which match the size and shape of the rollers 3. The accurate spacing of the indentations around the circumference of the sprocket wheels matches the spacing of the trunnions along the endless belt. In use, the rollers engage the indentations 12; the endless belts are then supported on two support wheels 20 mounted coaxially on either side of the sprocket wheels 10a, 10b and matching them in diameter.

In the case of the drive wheel 10a, a motor 9 drives the sprocket wheel 10a by means of a belt drive 8. As the motor 9 forces the drive wheel 10a to rotate, the indentations 12 engage the rollers 3 and force them, and so the trunnions 1 and hence the endless belts 2 around the wheel. This drives movement of the endless belts 2 along their lengths.

The guide wheel 10b shown in FIG. 5b is unpowered, so it will rotate with any movement of the endless belt, for example that driven by drive wheel 10a. However, in order to control the tension in the endless belts 2, a tensioning device 13 is provided. This provides a moveable axle for guide wheel 10b such that it can be moved relative to the endless belts to control the tension in the belts.

Figure 3D:
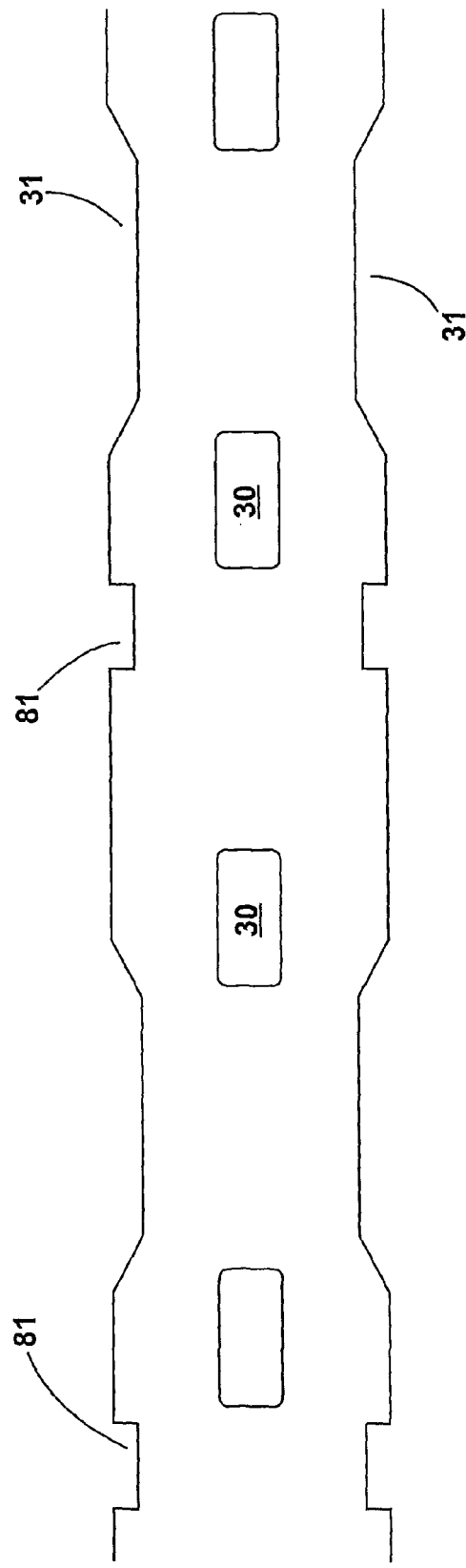
FIG. 3d shows an alternative endless belt for use with a toothed wheel.

An alternative belt is shown in FIG. 3d of the accompanying drawings. It is formed of a single slotted strip that has cut outs 30 pitched at accurate intervals. It can be used with the drive wheel shown in FIG. 8, which has protruding teeth 34 that can engage the cut outs 30.

The strip is provided with longitudinal indentations to allow clearance for attachments such as the bucket arm 4. Furthermore, it has keyed portions 31 to enable the strips forming the belt to be joined together accurately.

FIGS. 6a to 6d show a possible use for the conveyor system of the remaining Figures. Two conveyor systems 14 as described above are provided, where the trunnions 1 are each provided with a bucket arm 4. The conveyor systems 14 are coplanar with each other, but spaced apart from each other. The trunnions 1 of each system 14 are aligned. Between the conveyor systems 14, a bucket 18 is mounted between each corresponding pair of bucket arms 4.

This bucket conveyor system can be used much as the one described in EP 0 352 047. An example system is shown schematically in FIGS. 6c and 6d of the accompanying drawings. The conveyors are shown as 14. In the view of FIG. 6c, the long, thin side of the strips is visible; or in FIG. 6d the faces of the strips are visible.

In the arrangement of FIGS. 6c and 6d, buckets 18 are loaded at the bottom of the arrangement at loading point 15. Drive wheel 10a causes the endless belt to move around the system, driving the buckets to unloading points 16 and 17. A plurality of guide wheels 10b are provided around the course of the conveyor system, every time it desired to change the course of the conveyor system—in effect, at every end and corner.

The conveyor system of this embodiment and indeed of the invention as a whole is advantageous due to the reduction in the number of moving parts, the reduced requirement for lubrication and the improvement tensile strength compared with prior art conveyors. It can be used with many different conveyor systems, such as bucket conveyors, slat-, platform- or tray-type conveyors, vertical tray or folding platform conveyors, drag link conveyors, tubular flight type conveyors.

Figure 9A:
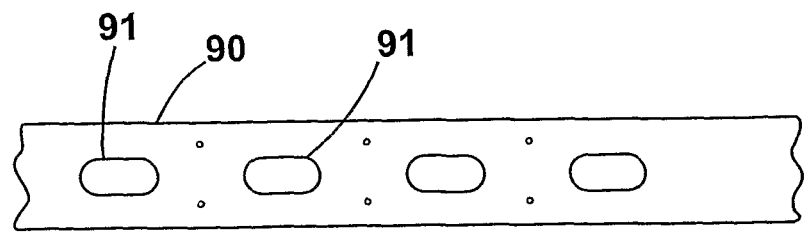
FIGS. 9a to 9c show transmission belts according to a second embodiment of the invention.
Figure 9B:
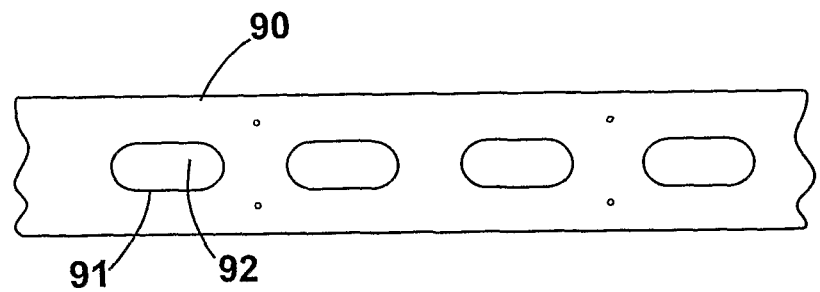
Figure 9C:
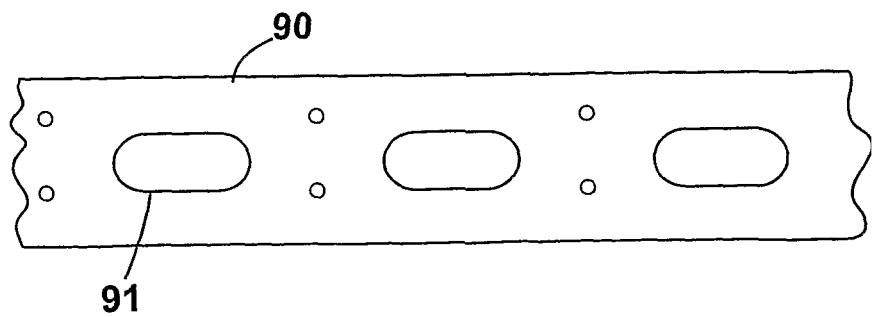
Figure 15:
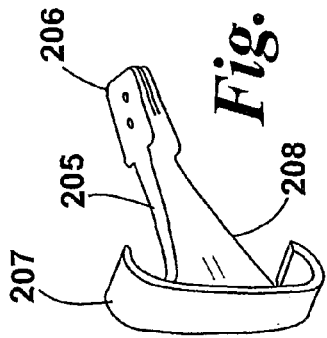
FIGS. 14 and 15 show scrapers for use in the conveyor of FIG. 13.
Figure 14:
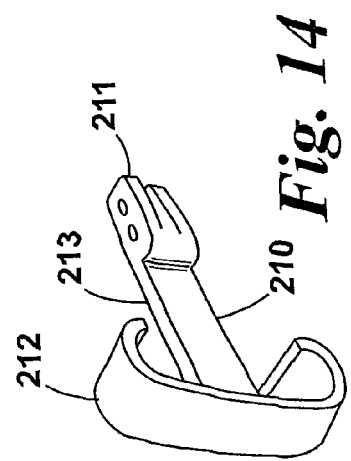

In a second embodiment of the invention, a conveyor according to the present invention can be used as a transmission belt. This is shown in FIGS. 9a to 9c of the accompanying drawings. The belts shown in FIGS. 9a to 9c vary only in the width of the belt to demonstrate how the belt can be adapted to different situations. FIG. 9a represents a bar of width 25 mm, FIG. 9b 20 mm and FIG. 9c 15 mm.

Each belt 90 comprises a plurality of spring steel or elastically deformable plastic strips as previously. The transmission belts 90 are provided with a series of holes 91 regularly spaced along the centreline 92 of the belt. Each of the strips may have a plurality of the holes 91, say 3 or 5, and may be joined together such that the strips overlap over at least one of the holes.

As such, these belts can be used with a drive wheel such as that shown in FIG. 8 of the accompanying drawings. It may conveniently be used to replace transmission chains or belts with the advantage that no moving parts are required in the transmission member. Further, the elastic nature of the belt means that the need for tensioning of the belt can be reduced or eliminated entirely, removing complexity in transmission systems.

Figure 10:
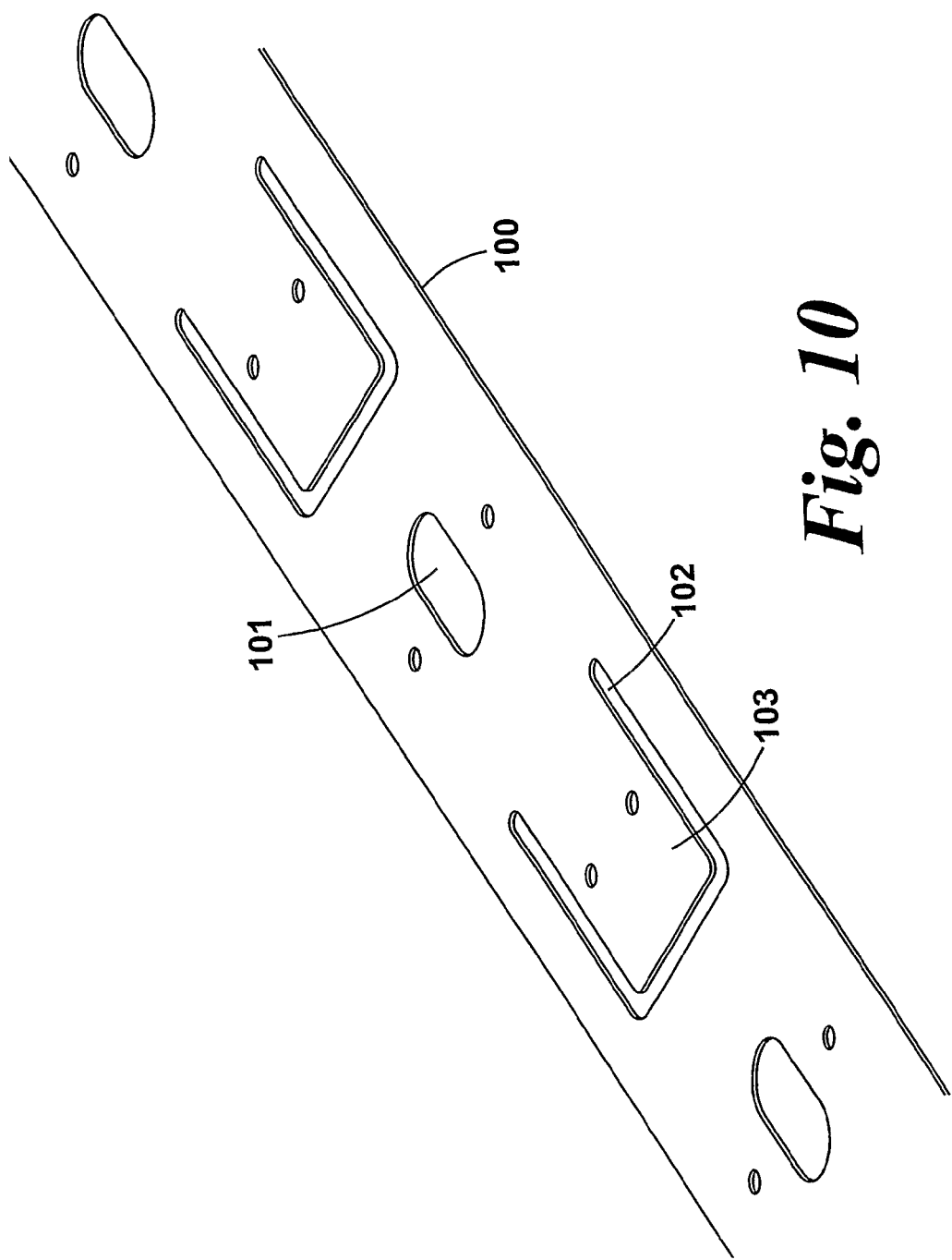
FIG. 10 shows a conveyor belt according to a third embodiment of the invention.
Figure 11:
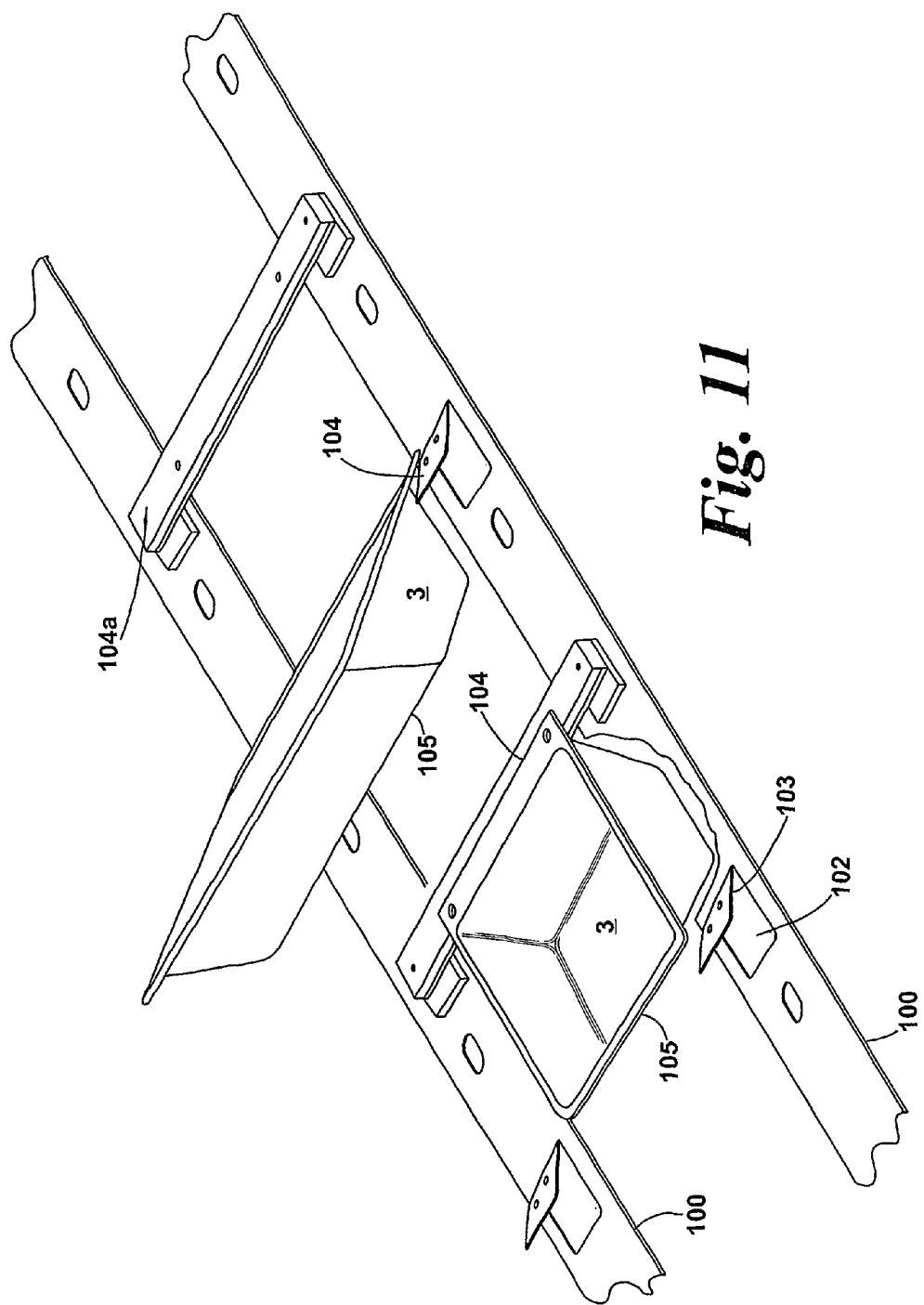
FIG. 11 shows a perspective view of part of a conveyor system using the belt of FIG. 10.

A third embodiment of the invention can be seen in FIGS. 10 to 12 of the accompanying drawings. As seen in FIG. 11 of the drawings, this comprises two belts 100, one of which is shown in more detail in FIG. 10 of the accompanying drawings. Each belt 100 comprises a plurality of strips fastened together in an overlapping manner as described previously. The strips are made out of spring steel. The strips, and hence each belt, have regularly spaced drive holes 101 that can engage a drive wheel of the form shown in FIG. 8 of the accompanying drawings.

The belts 100 are also provided with regularly spaced U-shaped grooves 102 cut out of the strips. Each groove defines a tongue 103 in the belt. Given that the strips are manufactured from spring steel, the tongues 103 can be bent elastically out of the plane of the belt, but will be biased back into the neutral position in the plane of the belt by the inherent spring force due to the elastic deformation of the spring steel strips.

This exploited in the conveyor system of the present embodiment. As shown in FIG. 11 of the accompanying drawings, the convey system links two belts 100 together.

Support bars 104 connect pairs of tongues 103, one from each belt 100. Each support bar 104 can therefore be shifted out of the plane of the belts, but will be biased back into contact therewith.

Each support bar 104 carries on it a bucket 105; the bucket on support bar 104a in FIG. 11 of the accompanying drawings is omitted for clarity. Accordingly, the buckets will generally lie in the plane of the belts 100, with their open side in that place unless some force acts on them to counter the biasing of the tongues 103.

Elements of the conveyor system of this embodiment can be seen in FIGS. 12a to 12c of the accompanying drawings. The buckets 105 are each provided with a cam 106 protruding from the buckets 105. If the cams do not engage any surfaces, they have no major effect on the movement of the buckets relative to the belt, and the buckets will respond to their weight and the spring force of the tongue. However, should the cams 106 engage a surface 107a, 107b, the cams can force the bucket out of the normal position.

This can therefore be used to control the orientation of the buckets 105 relative to the belts 100. In FIGS. 12a to 12b, the cams are used to keep the buckets level as the belts traverse a vertically winding course. By providing the surfaces 107a, 107b at an appropriate angle, the buckets can be set to any desired angle, be it horizontal as in the Figures, or even tipped so as to empty the contents of the buckets.

In FIG. 12c, no cams are used, but the buckets 105 themselves orient themselves on the surface 107c.

A fourth embodiment of a conveyor according to the present invention is shown in FIGS. 13 to 16 of the accompanying drawings. As before, this comprises a belt 200 comprised of a plurality of planar steel strips joined lengthwise. The belt 200 passes through a case 201. This embodiment uses a scraper to move a bulk material, such as grain, by scraping it along the inside of the case. The belt comprises regular tabs 202a, 202b which, because they are cut out of the steel material of the strips making up the belt, are sprung. Drive sprockets 214 are also provided There are two versions of the tabs 202a provided. The centre tabs 202a are provided in the centre of the belt 200, in an internally cut out portion 203. These tabs are provided with the centre scrapers 205 shown in FIG. 15 of the accompanying drawings (shown in outline in FIG. 13). The centre scrapers 206 comprise an attachment portion which is rigidly mounted to the tab 202a and a scraper portion 207 extending away from the attachment portion 206 on an arm 208.

The other version of the tabs is the side tab 202b. These are mounted on indents 209 into the side of the belt 200. These tabs 202b are provided with the side scrapers 210 shown in outline in FIG. 13 and in more detail in FIG. 14 of the accompanying drawings. Again, they comprise an attachment portion 211 and a scraper portion 212 extending away from the attachment portion 211 on an arm 213.

It can be seen that the side and centre scrapers 205, 210 are very similar, differing only in that the attachment means 211 of the side scraper 210 is asymmetric, as one will be mounted on either side of the belt in the indents 209, and that the arm 213 joins the scraper portion 212 at the lateral side thereof. The attachment means 206 of the centre scraper is symmetric, and the arm 208 joins the scraper at the lateral centre of the scraper portion 207.

Figure 13:
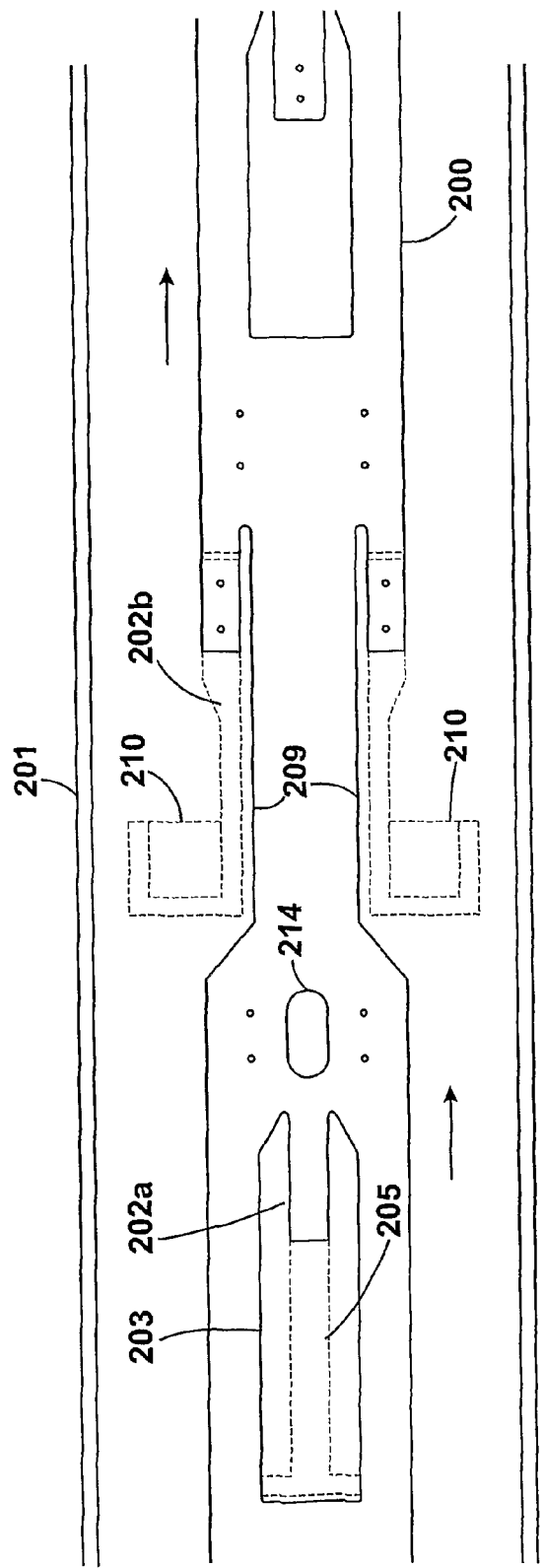
FIG. 13 shows a plan view of a conveyor according to a fourth embodiment of the invention.
Figure 16:
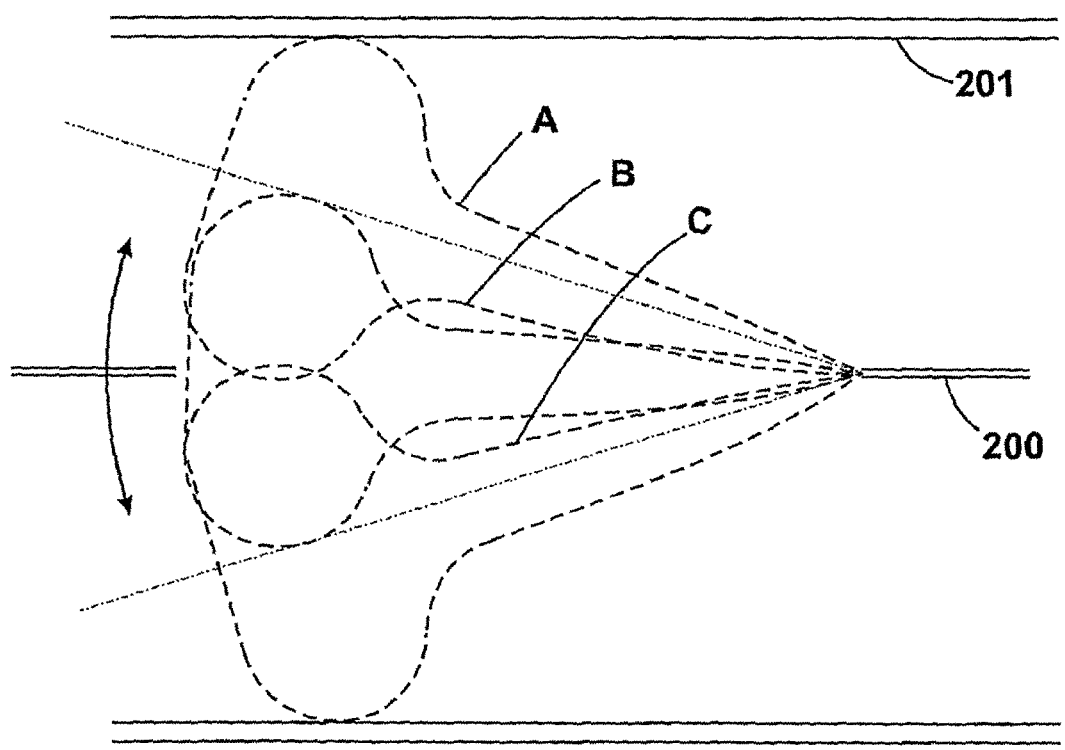
FIG. 16 shows a side elevation of the conveyor of FIG. 13.

The effect of this arrangement can be seen in FIG. 16 of the accompanying drawings, which shows the equivalent side view to the plan view of FIG. 13. This shows that one of the scrapers can float between the walls of the case 201. The scraper, shown in three different positions A, B and C can pivot against the spring force due to its tab 202a/202b, dependent upon loading and whether any external force is being applied to it.

Whilst both types of tab and scraper could be used together, typically only one or the other would be used.

Figure 17:
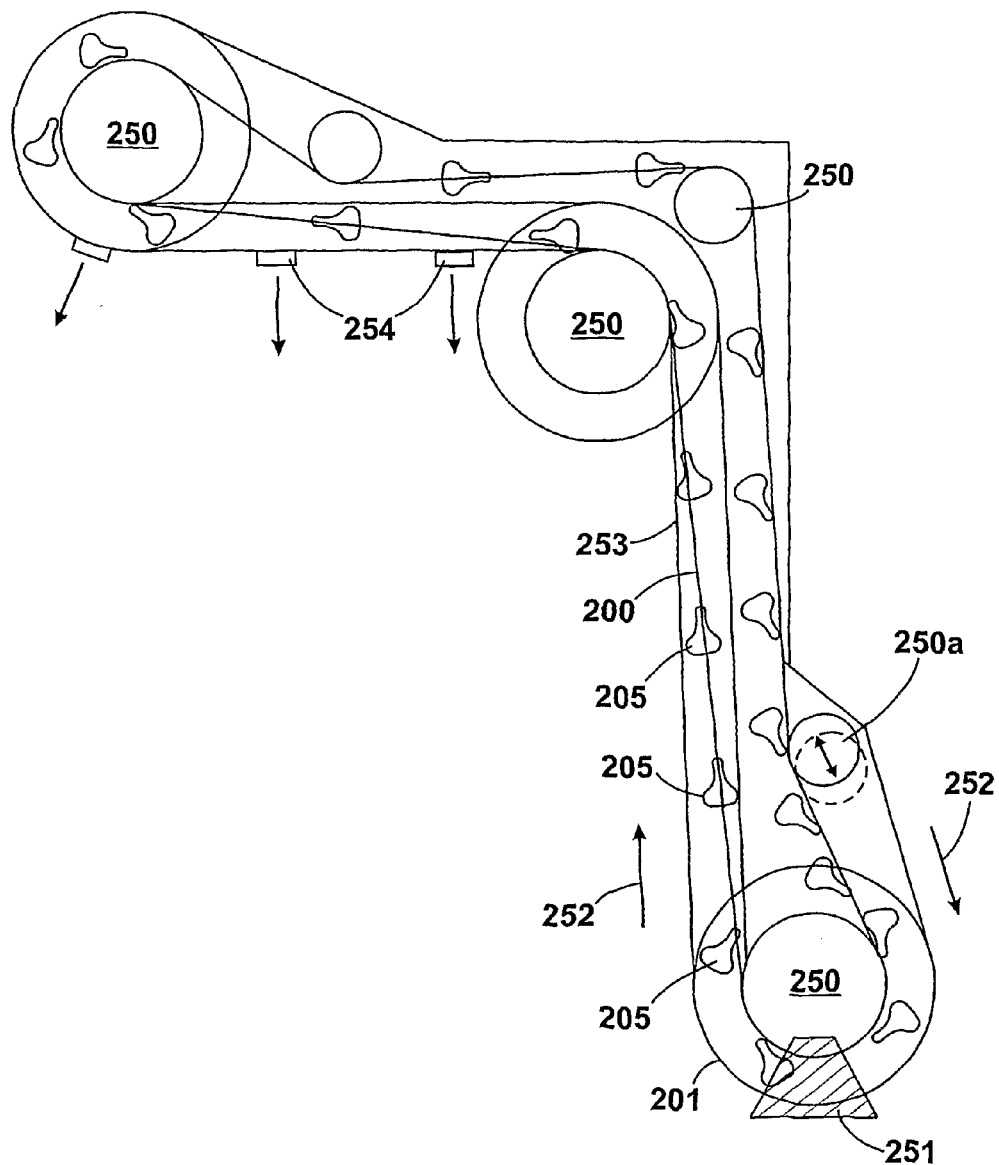
FIG. 17 shows a conveyor system using the conveyor of FIG. 13.

A conveyor system using such a conveyor is shown in FIG. 17 of the accompanying drawings. The belt 200 is endless and passes over several pulleys 250, any or all of which could be driven and so drive the belt 200 by means of the drive sprockets 214. A tensioning pulley 250a is provided to control the tension in the belt.

The conveyor system takes in material to be transported at a pickup zone 251, where a bulk material is introduced into the case 201. The scrapers, shown here as centre scrapers 205, scrape the material against the side of the case 201 as the belt is driven in the direction of arrows 252.

The scrapers will take their position from the position of the belt relative to the edge of the case as the belt passes along the shortest route from pulley 250 to pulley 250; this can be seen in the vertical straight 252 above the pickup zone 251, where the scrapers 205 float from one side of the case to the other, carrying the material to be transported.

Apertures 254, which can be selectively opened, provide a discharge zone for the material to be transported, which will have been transported from pickup zone 251 to discharge zone 254.

Figures 18, 19:
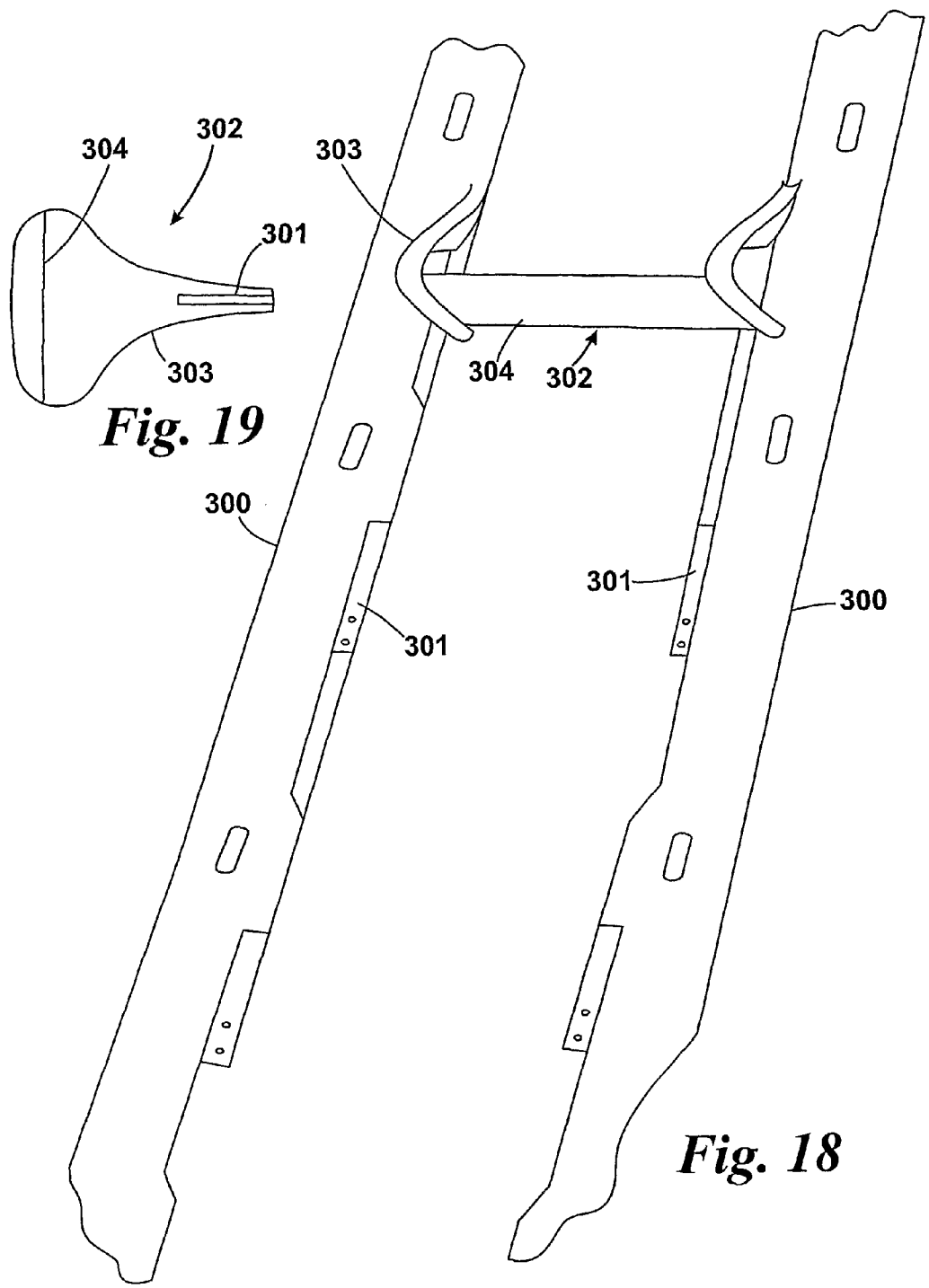
FIG. 18 shows a conveyor according to a fifth embodiment of the invention.
FIG. 19 shows a cross section through the scraper of the conveyor of FIG. 18.

A fifth embodiment of a conveyor according to the present embodiment can be seen in FIGS. 18 and 19 of the accompanying drawings. This comprises two belts 300 of the form of a plurality of planar steel strips joined lengthwise to form an endless belt. The belts are provided with tabs 301 extending in the plane of the belts which, due to the resilient nature of the steel from which they are fashioned, are effectively sprung. The tabs 301 of one belt are aligned with the tabs of the other belt.

Each pair of aligned tabs 301 are used to mount a floating scraper 302 therebetween. The floating scraper comprises an arm 303 attached to each tab 301. The arm is of the form of a loop in a plane generally perpendicular to that of the belt 300, but parallel to the length of the belt 300. The ends of the loop lie parallel to one another attached to the tab, whereas the loop widens as it extends away from the tab 301. The shape of the loop is symmetric.

A scraper portion 304 is mounted between the two arms 303, mounted in the interior of the two loops. The scraper portion 304 is formed as a bar between the two arms. The scraper portion 304 is mounted at the furthest portion of the loop from the tabs 303, so that the scraper 302 as a whole has a plane of symmetry. This plane of symmetry is co-planar with the plane of the belts 300 when the tabs are aligned with the rest of their belts and so the scraper is in a neutral position when considering the spring forces applied on it by the tabs 301.

Figure 20:
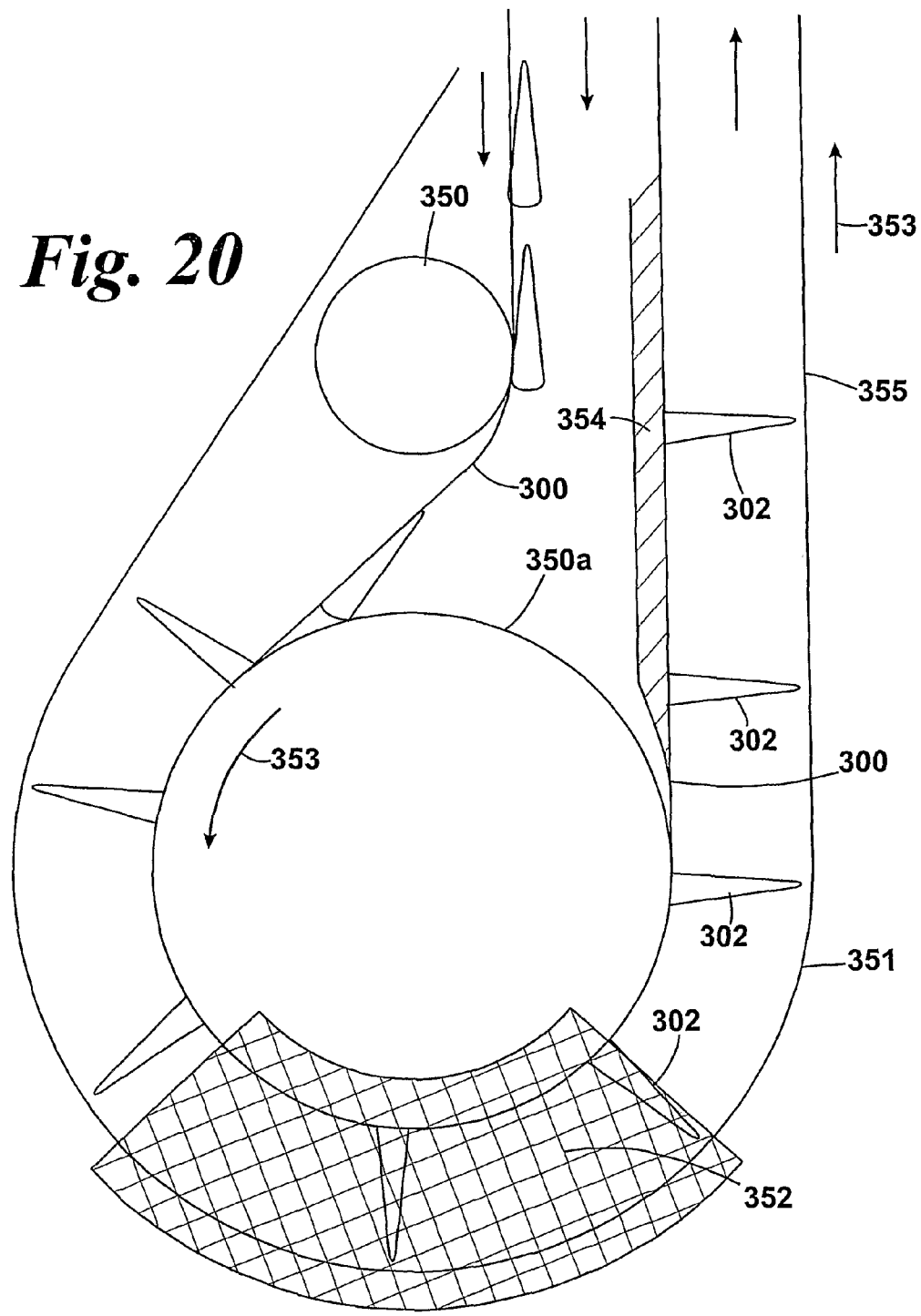
FIGS. 20 and 21 together show a conveyor system using the conveyor of FIG. 18.
Figure 21:
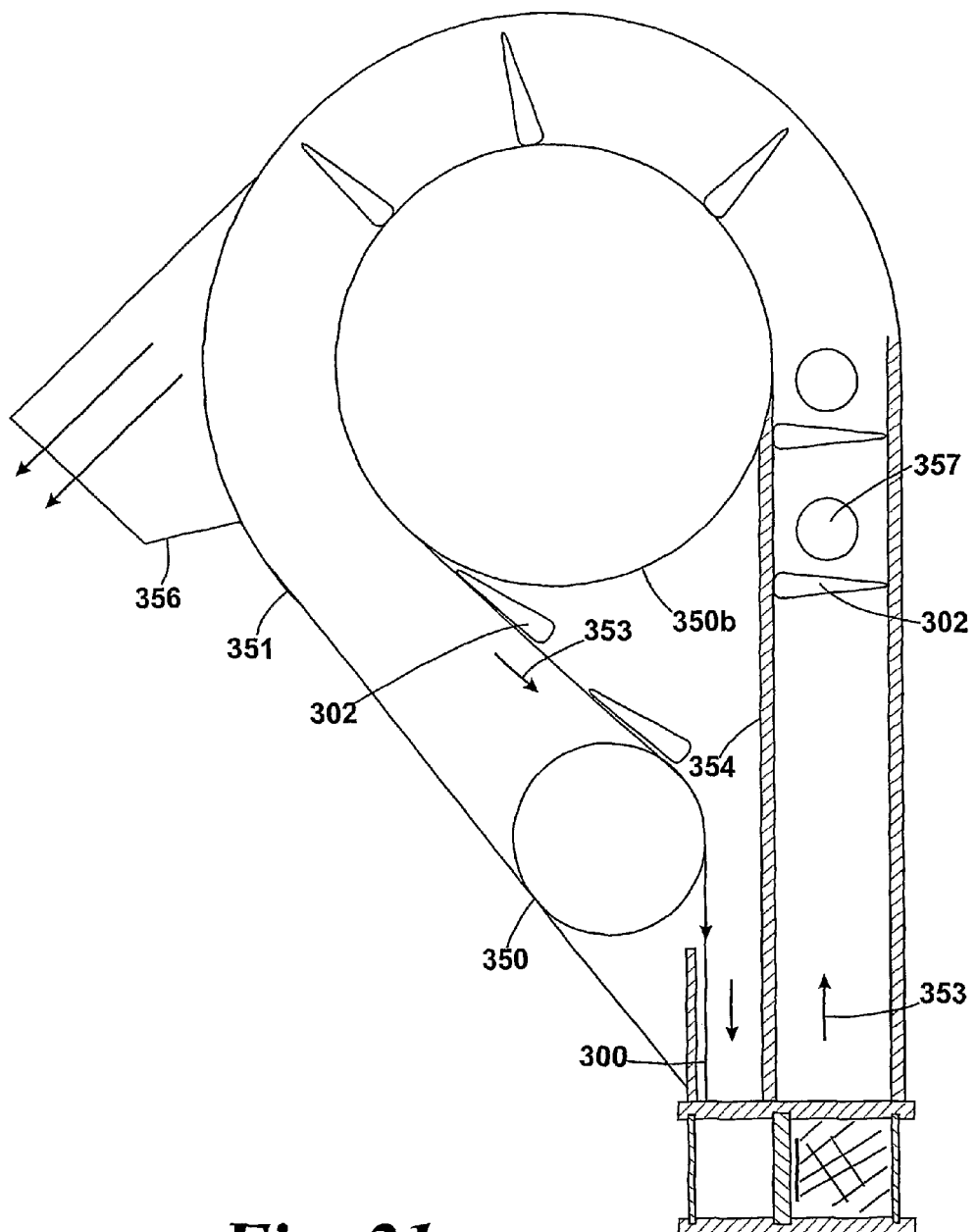

A conveyor system using such a conveyor can be seen in FIGS. 20 and 21 of the accompanying drawings. FIG. 20 shows the bottom half of the apparatus, whereas FIG. 21 shows the top.

As with the conveyor system of FIG. 17, the belts 300 run over a course defined by a series of pulleys 350 (including pulleys 350a, 350b discussed below), taking the shortest route therebetween. The belts 300 run in a case 351.

The conveyor system transports bulk material from a pickup zone 352 where the bulk material is introduced into the case 351. The conveyor is driven in the direction shown by arrows 353 by driving one of the pulleys 350.

Where the belts 300 are running over one of the pulleys 350, such as adjacent to the pickup zone 352, the arms 303 will be pushed out of the neutral position, so as to direct the scraper 302 outwards from the belt. By appropriately shaping the arms, it is possible to have the scrapers substantially perpendicular to the belts 300 as shown in FIGS. 20 and 21. In such a position, they will scrape the bulk material along the inside of the case 351.

Where the belts 300 are not running over a pulley, this substantially perpendicular position of the scrapers 302 can be achieved by running the belts over a ramp 354. Such a ramp is provided the length of the vertical straight 355 from the bottommost pulley 350a at the pickup zone 352 to the topmost pulley 350b. Thus, bulk material (shown at 357) will be scraped all the way from the pickup zone 352 to the top of the conveyor system.

However, once the belts reach the topmost pulley 350b, there is no further ramp. Accordingly, the scrapers 302 retract into the belt, lying co-planar therewith—the neutral position. The bulk material being transported can then be discharged through discharge zone 356.

Figure 22:
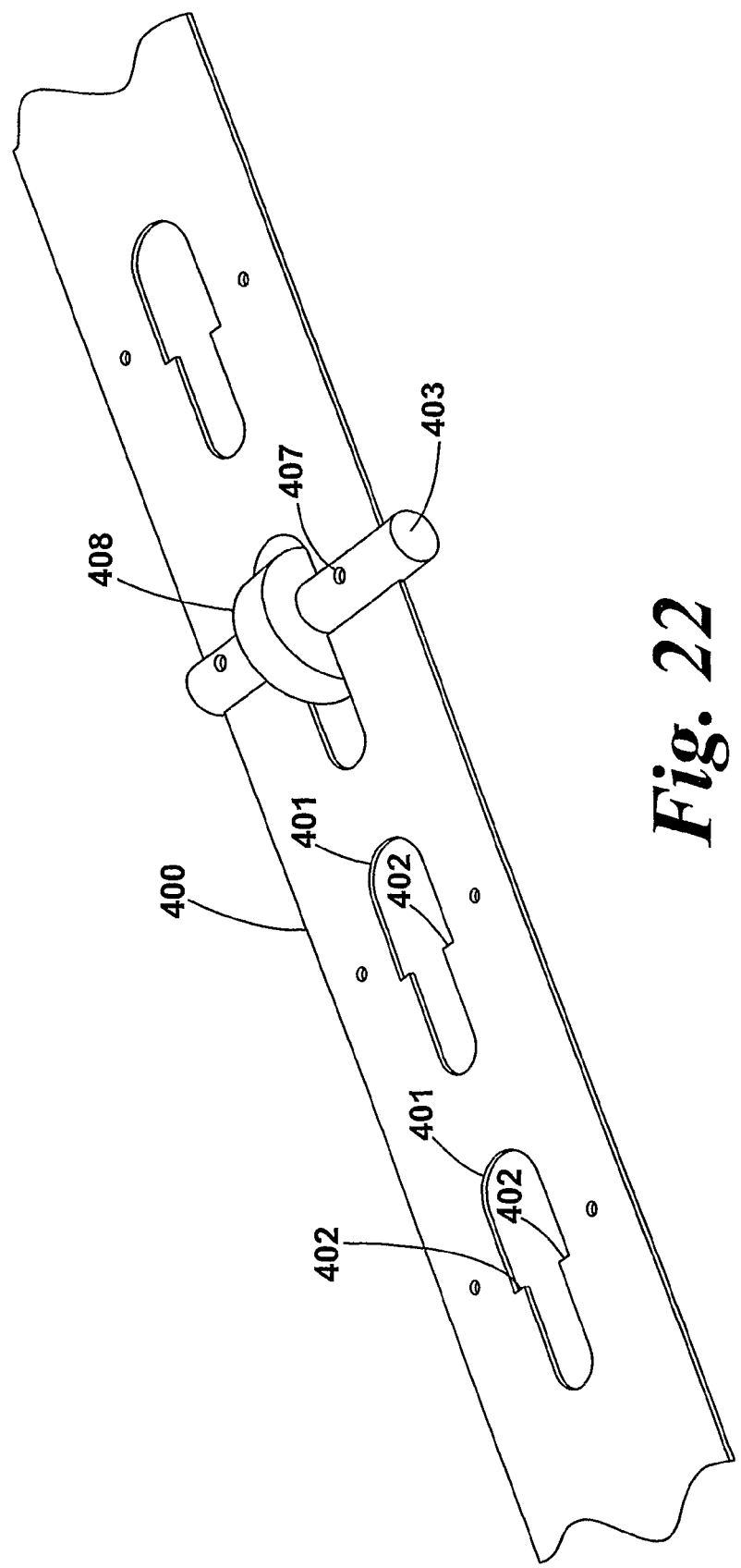
FIG. 22 shows a conveyor according to a sixth aspect of the invention.

An alternative belt 400 for use in the present invention can be seen in FIGS. 22 to 24 of the accompanying drawings. This comprises a single strip of spring steel, laser cut to form the shape shown. The edges can then easily be smoothed and deburred, such that the belt can then smoothly run over any suitable surface.

The belt comprises a plurality of drive slots 401. These slots are generally of the form of slot having straight, parallel sides along the length of the belt 400 and rounded ends. The straight sides each have a step 402 therein at matching points, so that at the steps 402 the slot reduces in width.

A trunnion 403 is mounted in each slot; only one is shown in FIG. 22. As can be seen in more detail in FIGS. 23a and 23b, the trunnion comprises a cylindrical body 404, which has two cut out portions 405. A roller 408 is provided on the body 404. The cut out portions are the same width as the metal parts of the belt adjacent to the wider parts of the slots 401; that is, the part of the belt that remains after the slot is made.

Figure 23A:
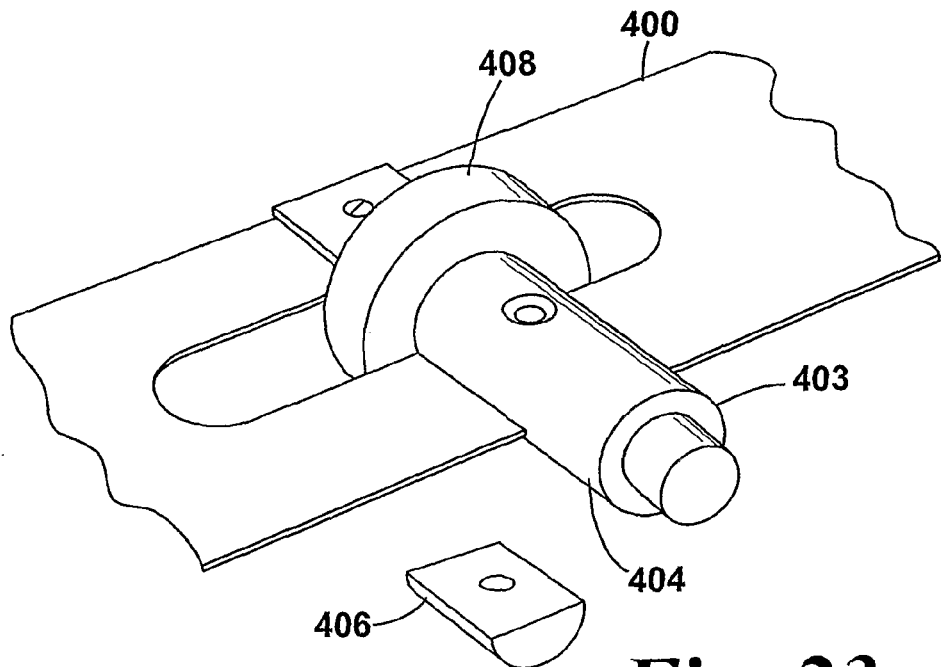
FIGS. 23a and 23b are exploded enlargements show the trunnion of FIG. 22 in more detail.
Figure 23B:
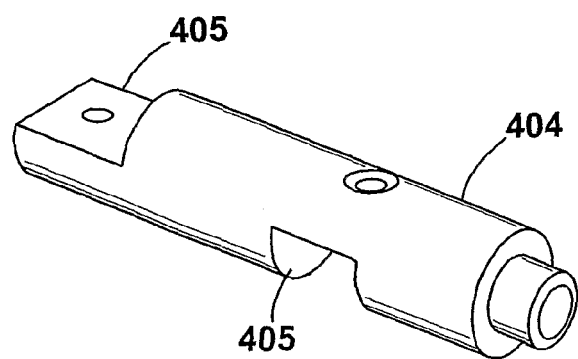

The trunnion is mounted as shown in FIG. 23a, in the wider portion of the slot, but immediately adjacent to the step. Once the trunnion is positioned on the belt, a locking portion 406 (only one shown) can be introduced into the cutout to sandwich the belt between the body 404 and the locking portion 406; the three items can then be secured together by a pin 407.

This belt can be used with the drive wheel 410 shown in FIGS. 24a and 24b of the accompanying drawings. This wheel 410 has indentations 411 as in previous embodiments for engaging the roller 408 of the trunnions 403. The wheel also has hardened steel guide studs 412, which engage the narrower part of the slots 401 in order to ensure that the belt 400 is correctly positioned relative to the wheel 410 for the trunnions 403 to engage the indentations 411.

Once the trunnions 403 are in the indentations 411, the drive wheel can then apply force to the belt 400 in order to move it. Due to the width of the cut out portions 405, this force is transmitted through the trunnions to the belt by means of the step 402. This is more reliable than relying on, for example, the pin 407.

The invention claimed is:

1. A belt, forming a conveyor or a transmission belt, comprising:
    (a) at least one substantially inextensible but elastically flexible planar strip rigidly fixed together lengthwise to form an endless belt and
    (b) a plurality of trunnions fixed to the belt at intervals along the belt, in which the belt is provided with a plurality of regularly spaced drive slots, each drive slot having circumference in which there is a step, and in which each trunnion is mounted in one of the drive slots.

2. The belt of claim 1, in which there is a plurality of strips, fastened together at regular intervals.

3. The belt of claim 1, in which each strip is elongate and is elastically flexible in bending lengthwise out of its plane.

4. The belt of claim 1, in which each trunnion comprises a generally cylindrical body fixed to the belt, with an axis of the cylindrical body at right angles to the length of the belt, but in the plane of the or each strip.

5. The belt of claim 4, in which each trunnion comprises a roller fitted over the cylindrical body.

6. The belt of claim 1, in which the trunnions are provided at regular intervals along the endless belt.

7. The belt of claim 1, provided with at least one drive or guide wheel engaging the endless belt, the wheel comprising at least one generally circular sprocket having indentations spaced around its circumference at a spacing being the same as a spacing of the trunnions along the belt.

8. The belt of claim 1, in which the belt comprises a drive wheel shaped to engage the slots.

9. The belt of claim 1, provided with a support for a carrier.

10. The belt 9, in which the support for the carrier comprises a bendable portion of a strip that can be resiliently bent out of the plane of the strip.

11. The belt of claim 9, in which the carrier is provided with a cam; the belt comprising a cam surface which the cam follows as the belt moves, controlling the orientation of the carrier relative to the or each belt.

12. A conveyor comprising two endless belts each comprising a plurality of trunnions fixed to the belts at intervals along the belts and at least one substantially inextensible but elastically flexible planar strip rigidly fixed together lengthwise to form an endless belt, in which the belt is provided with a plurality of regularly spaced drive slots, each drive slot having circumference in which there is a step and each trunnion is mounted in one of the drive slots, in which the endless belts are co-planar with one another in the plane of the or each strip.

13. The conveyor of claim 12, in which the two belts are joined together at regular intervals.

14. The conveyor of claim 12, in which, the belts are joined together by the trunnions, such that each trunnion is fixed to both belts.

15. The conveyor of claim 12, in which each belt is provided with a support for a carrier, in which the belts are joined together by the support for the carrier or by the carrier itself.

* * * * *